United States Patent Office 3,386,994
Patented June 4, 1968

3,386,994
PREGNA - 4,6 - DIENE- AND 19-NORPREGNA-4,6-DIENE - 3β,16,17α - TRIOL STEROIDS, DERIVATIVES THEREOF, AND PROCESSES FOR THEIR PREPARATION
Alexander D. Cross and Ian T. Harrison, Mexico City, Mex., assignors to Syntex Corporation, Panama, Panama, a corporation of Panama
No Drawing. Filed May 5, 1965, Ser. No. 453,511
14 Claims. (Cl. 260—239.55)

ABSTRACT OF THE DISCLOSURE

Novel pregna-4,6-diene- and 19-norpregna-4,6-diene steroids of the pregnane series and derivatives thereof containing substitution at the C–3, C–6, C–16, and C–17α positions which compounds are progestational and anti-inflammatory agents and processes for the preparation of such compounds.

---

This invention relates to novel cyclopentanopolyhydrophenanthrene derivatives and to processes for the preparation thereof.

More particularly, this invention relates to novel $\Delta^{4,6}$-pregnadiene- and 19-nor-$\Delta^{4,6}$-pregnadiene-3β,17α-diol derivatives represented by the general formula:

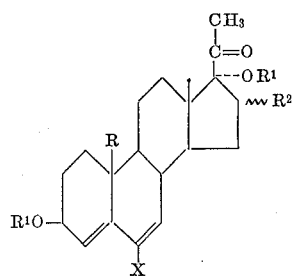

(A)

In the above formula R represents hydrogen or methyl, $R^1$ represents hydrogen or an acyl group, $R^2$ represents hydrogen, α-methyl, β-methyl, α-hydroxyl, or α-acyloxy, $OR^1$ and $R^2$ taken together represent the grouping:

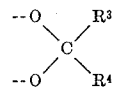

wherein $R^3$ and $R^4$ represent hydrogen, an alkyl (including cycloalkyl) group or an aryl (including aralkyl and alkaryl) group containing up to 8 carbon atoms, inclusive, and X represents hydrogen, methyl, fluoro, chloro or bromo.

The acyloxy and acyl groups referred to herein are preferably derived from hydrocarbon carboxylic acids containing less than 12 carbon atoms. These acids can be saturated or unsaturated (including aromatic), and can have straight, branched, cyclic or cyclic-aliphatic chains. In addition, they can be substituted with one or more functional groups, such as hydroxyl groups, alkoxy groups containing up to 6 carbon atoms, acyloxy groups containing up to 12 carbon atoms, nitro groups, amino groups or halogen atoms. Typical ester groups are the acetate, proprionate, enanthate, benzoate, trimethylacetate, t-butylacetate, phenoxyacetate, cyclopentylpropionate, aminoacetate, and β-chloropropionate groups.

The novel $\Delta^{4,6}$-pregnadiene- and 19-nor-$\Delta^{4,6}$-pregnadiene-3β,17α-diol derivatives represented by Formula A hereinabove are progestational agents which also possess anti-androgenic activity and are also useful in the treatment of menstrual disorders and in fertility control.

These novel $\Delta^{4,6}$-pregnadiene- and 19-nor-$\Delta^{4,6}$-pregnadiene-3β,17α-diol derivatives can be prepared by processes which can be illustrated schematically as follows:

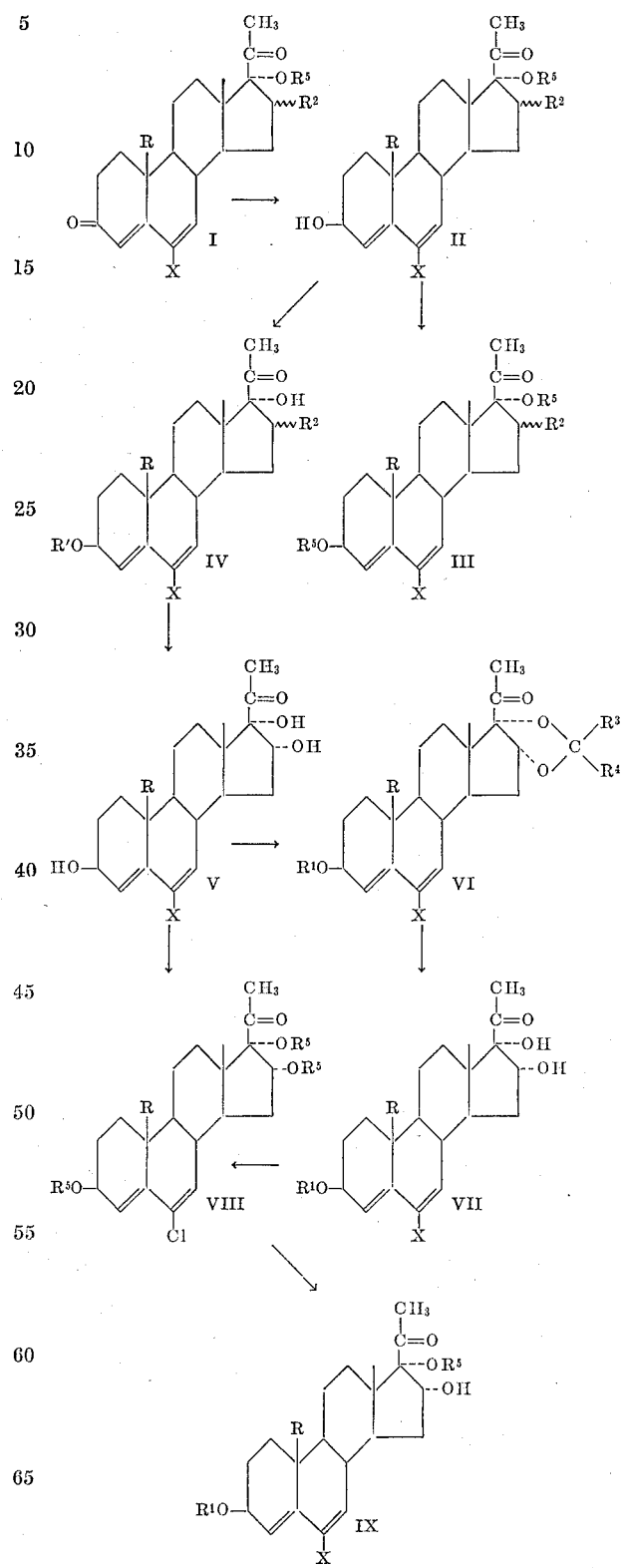

In these formulas R, $R^1$, $R^2$, $R^3$, $R^4$ and X have the same meanings as set forth hereinabove for Formula A, and $R^5$ represents an acyl group.

The starting materials represented by Formula I hereinabove are prepared in the manner described in U.S. Patent No. 3,138,589 to Ringold et al.

In carrying out the above-illustrated processes, the starting material (I), e.g., 6-chloro-$\Delta^{4,6}$-pregnadien-17α-ol-3,20-dione 17-acetate (I; R=methyl, R$^5$=acetyl, R$^2$=hydrogen, X=chloro), is dissolved in an inert organic solvent, e.g., a lower alkanol such as methanol or ethanol, an ether such as dioxane or tetrahydrofuran, or the like, and reacted under substantially anhydrous conditions with from about 0.5 mol to about 10 mols, and preferably from about 1 to about 4 mols, per mol of steroid starting material, of sodium borohydride, lithium borohydride, or the like, at a temperature ranging from about 0° C. to about 60° C., and preferably at room temperature for from about 10 minutes to about 12 hours, to give the corresponding 3β-ol (II), e.g., 6-chloro-$\Delta^{4,6}$-pregnadiene-3β,17α-diol-20-one 17-acetate (II; R=methyl, R$^5$=acetyl, R$^2$=hydrogen, X=chloro).

The thus-obtained 3β-ol can be acylated, using an anhydride or chloride of an organic acid, e.g., one derived from an acid of the type referred to hereinabove, in pyridine or the like at room temperature, thus giving the corresponding 3,17-diacylate (III). For example, by reacting 6-chloro-$\Delta^{4,6}$-pregnadiene-3β,17α-diol-20-one 17-acetate with acetic anhydride in pyridine at room temperature for 20 hours, the corresponding 3,17-diacetate (III; R=methyl, R$^5$=acetyl, R$^2$=hydrogen, X=chloro) is obtained.

The 17α-acyloxy group in the 3β-ol (II) can also be hydrolyzed, e.g., by boiling with a 1-5% solution of sodium hydroxide, potassium hydroxide, or the like, in a lower alkanol under an inert nitrogen atmosphere for from about 1 hour to about 3 hours or longer, to produce the corresponding 3β, 17α-diol (IV), e.g., 6-chloro-$\Delta^{4,6}$-pregnadiene-3β, 17α-diol-20-one (IV; R=methyl, R$^1$ and R$^2$=hydrogen, X=chloro).

By reacting the thus-obtained 3β, 17α-diol (IV) with an acid anhydride or chloride in pyridine or the like in the manner described hereinabove, the corresponding 3-monoacylate (IV), e.g., 6-chloro-$\Delta^{4,6}$-pregnadiene-3β, 17α-diol-20-one 3-acetate (IV; R=methyl, R$^1$=acetyl, R$^2$=hydrogen, X=chloro), is obtained.

When a 16-unsubstituted-3β, 17α-diol (IV), e.g., 6-chloro-$\Delta^{4,6}$-pregnadiene-3β, 17α-diol-20-one, is incubated in known manner with an oxygenating microorganism such as Streptomyces roseochromogenus or the like, the corresponding 3β, 16α, 17α-triol (V), e.g., 6-Chloro-$\Delta^{4,6}$-pregnadiene-3β, 16α, 17α-triol-20-one (V; R=methyl, X=chloro), is produced.

The thus-prepared 3β, 16α, 17α-triol can be reacted with an aldehyde or ketone in the presence of a catalytic amount of a strong acid, such as perchloric acid, p-toluenesulfonic acid, or the like, in the manner described in U.S. Patent No. 3,048,581 to Fried, thus giving the corresponding 16α, 17α-cyclic acetal or ketal (VI), e.g., 6 - chloro-16α, 17α-isopropylidenedioxy-$\Delta^{4,6}$-pregnadien-3β-ol-20-one (VI; R, R$^3$ and R$^4$=methyl, R$^1$=hydrogen, X=chloro).

Esterification of the free 3β-hydroxyl group in the resulting 16α, 17α-cyclic acetal or ketal with an acid anhydride or chloride in pyridine or the like in the manner described hereinabove gives the corresponding 3-acylate (VI), e.g., 6-chloro-16α, 17α-isopropylidenedioxy-$\Delta^{4,6}$-pregnadien-3β-ol-20-one 3-acetate (VI; R, R$^3$ and R$^4$=methyl, R$^1$=acetyl, X=chloro).

Hydrolysis of the 16α, 17α-cyclic acetal or ketal grouping in the thus-prepared 3-acylate, using an aqueous 60-90% solution of formic acid at a temperature of from about 50° C. to about 110° C. for from about 1 minute to about 1 hour, gives the corresponding 3β-acyloxy-16α, 17α-diol (VII), e.g., 6-chloro-$\Delta^{4,6}$-pregnadiene-3β, 16α, 17α-triol-20-one 3-acetate (VII; R=methyl, R$^1$=acetyl, X=chloro).

By reacting either the 3β-acyloxy- 16α, 17α-diol (VII) or the 3β, 16α, 17α-triol (V) with a mixture of an organic acid and the corresponding acid anhydride at room temperature in the presence of a catalytic amount of a strong acid, such as p-toluenesulfonic acid or the like, the corresponding 3, 16, 17-triacylate (VIII) is obtained. For example, by reacting 6-chloro-$\Delta^{4,6}$-pregnadiene-3β, 16α, 17α-triol-20-one or its 3-acetate with a mixture of acetic acid and acetic anhydride in the presence of a catalytic amount of p-toluenesulfonic acid, the corresponding 3, 16, 17-triacetate (VIII; R=methyl, R$^5$=acetyl, X=chloro) is obtained.

The 3β- and 16α-acyloxy groups in the thus-obtained 3, 16, 17-triacylate can be selectively hydrolyzed, using a dilute aqueous solution of a strong base in a lower alkanol, preferably a 1-5% aqueous methanolic solution of sodium hydroxide or potassium hydroxide, at room temperature for from about 10 minutes to about 10 hours, thus giving the corresponding 3β, 16α, 17α-triol 17-acylate (IX), e.g., 6-chloro-$\Delta^{4,6}$-pregnadiene-3β, 16α, 17α-triol-20-one 17-acetate (IX; R=methyl, R$^1$=hydrogen, R$^5$=acetyl, X=chloro).

The free 3β-hydroxyl group in the resulting 3β, 16α, 17α-triol 17-acylate can then be selectively reacylated by reacting said 17-acylate with an acid anhydride, on a mol-for-mol basis, in pyridine or the like at a temperature of about 20° C. or below, thus giving the corresponding 3β, 16α, 17α-triol, 3, 17-diacylate (IX). For example, by reacting 6-chloro-$\Delta^{4,6}$-pregnadiene-3β, 16α, 17α-triol-20-one 17-acetate with acetic anhydride, on a mol-for-mol basis, in pyridine at 20° C., the corresponding 3, 17-diacetate (IX; R=methyl, R$^1$ and R$^5$=acetyl, X=chloro) is obtained.

In those cases wherein any of the esterification reactions described hereinabove are carried out on steroid starting materials wherein one hydroxyl group has previously been esterified, esterifying agents different from those previously employed can be used, if desired, to give mixed esters. For example, by esterifying 6-chloro-$\Delta^{4,6}$-pregnadiene-3β, 16α, 17α-triol-20-one 17-acetate with propionic anhydride in the manner just described, the corresponding 3 - propionate-17-acetate (IX; R=methyl, R$^1$=propionyl, R$^5$=acetyl, X=chloro) is obtained.

In order that those skilled in the art can more fully understand the present invention, the following examples are set forth. These examples are given solely for the purpose of illustrating the invention, and should not be considered as expressing limitations unless so set forth in the appended claims.

PREPARATION A

A mixture of 5 grams of 16a-methyl-17α-acetoxy progesterone, 100 grams of chloranil and 200 cc. of t-butanol was refluxed for 10 hours. Following this reaction period the reaction mixture was cooled and the excess of chloranil filtered off and washed with a large volume of ethyl acetate. These washings were then added to the filtrate, and the combined solution was washed with a cold, aqueous 10% sodium hydroxide solution until the washings were colorless. The organic layer (chiefly ethyl acetate, containing the product) was then dried over anhydrous sodium sulfate and evaporated to dryness. Recrystallization of the resulting residue from methylene dichloride/diethyl ether gave 16α-methyl-$\Delta^{4,6}$-pregnadien-17α-ol-3,20-dione 17-acetate.

By repeating this procedure in every detail but one, namely, replacing 16α-methyl-17α-acetoxy progesterone with 16α-methyl-19-nor-17α-acetoxy progesterone, 16β-methyl-17α-acetoxy progesterone and 16β-methyl-19-nor-17α-acetoxy progesterone, the corresponding 6-dehydro steroids, i.e., 16α-methyl-19-nor-$\Delta^{4,6}$-pregnadien - 17α - ol-3,20-dione 17-acetate, 16β-methyl-$\Delta^{4,6}$-pregnadien-17α-ol-3,20-dione 17-acetate and 16β-methyl-19-nor-$\Delta^{4,6}$-pregnadien-17α-ol-3,20-dione 17-acetate, respectively were obtained.

PREPARATION B

A solution of 4 grams of 16α-methyl-19-nor-Δ$^{4,6}$-pregnadien-17α-ol-3,20-dione 17-acetate in 100 cc. of chloroform was cooled to 0° C., then admixed with 4 molar equivalents of monoperphthalic acid dissolved in diethyl ether. The resulting reaction mixture was held at room temperature for 20 hours, following which it was diluted with water. Next, the organic layer was separated, washed with an aqueous sodium bicarbonate solution and then with water until neutral, then dried over anhydrous sodium sulfate and finally evaporated to dryness. Recrystallization of the dry residue from acetone/hexane gave 6α,7α-oxido-16α-methyl-19-nor-Δ$^4$-pregnen-17α - ol - 3,20-dione 17-acetate.

One gram of 6α,7α-oxido-16α-methyl-19-nor-Δ$^4$-pregnen-17α-ol-3,20-dione 17-acetate was suspended in 35 cc. of glacial acetic acid. A slow current of anhydrous hydrogen chloride gas was passed through the suspension, and was continued for 5 hours. The reaction mixture was then concentrated to about ⅓ its original volume by distillation under reduced pressure at 35° C., then poured into ice water. The thus-formed precipitate was collected by filtration, washed with water until neutral, and then dried. Recrystallization from methylene dichloride-hexane gave 6-chloro-16α-methyl-19-nor-Δ$^{4,6}$ - pregnadien - 17α - ol-3,20-dione 17-acetate.

Similarly, by replacing anhydrous hydrogen chloride gas with anhydrous hydrogen bromide, there is obtained 6-bromo-16α-methyl-19-nor-Δ$^{4,6}$-pregnadien-17α-ol - 3,20-dione-17-acetate

PREPARATION C

In accordance with the method described in Preparation B, 16β-methyl-19-nor-Δ$^{4,6}$-pregnadien-17α - ol - 3,20-dione-17-acetate, 16β-methyl-Δ$^{4,6}$-pregnadien-17α-ol-3,20-dione-17-acetate and 16α-methyl-Δ$^{4,6}$-pregnadien-17α - ol-3,20-dione were converted into the corresponding 6-chloro-16β-methyl-19-nor-Δ$^{4,6}$ - pregnadien - 17α - ol - 3,20-dione-17-acetate,6-chloro-16β-methyl - Δ$^{4,6}$ - pregnadien-17α-ol-3,20-dione-17-acetate, 6-chloro-16α - methyl - Δ$^{4,6}$-pregnadien-17α-ol-3,20-dione, 6-bromo-16β - methyl - 19-nor - Δ$^{4,6}$ - pregnadien - 17α - ol - 3,20 - dione - 17 - acetate, 6-bromo-16β - methyl - Δ$^{4,6}$ - pregnadien - 17α - ol-3,20-dione-17-acetate, and 6-bromo-16α-methyl-Δ$^{4,6}$-pregnadien-17α-ol-3,20-dione 17-acetate.

PREPARATION D

A solution of 1 gram of 6α,7α-oxido-16α-methyl-19-nor-Δ$^4$-pregnen-17α-ol-3,20-dione 17-acetate in a mixed solvent consisting of 25 cc. of benzene and 25 cc. of diethyl ether was admixed with 5 cc. of freshly distilled boron trifluoride etherate. The resulting reaction mixture was allowed to stand at room temperature overnight, following which it was diluted with water. The organic layer was separated, washed with water, dried over anhydrous sodium sulfate and evaporated to dryness under vacuum, thus giving 6β-fluoro-16α-methyl-19-nor - Δ$^4$ - pregnene-7α,17α-diol-3,20-dione 17-acetate.

This 6β-fluoro-7α-hydroxy intermediate was suspended in 35 cc. of glacial acetic acid, and a slow current of anhydrous hydrogen chloride gas was passed through this suspension for 4 hours. Following this reaction period the product was worked up in the manner described in Preparation C hereinabove, thus giving 6-fluoro-16α-methyl-19-nor-Δ$^{4,6}$-pregnadien-17α-ol-3,20-dione 17-acetate.

By repeating this entire procedure in every detail but one, namely, using 6α,7α-oxido-16α-methyl-Δ$^4$-pregnen-17α-ol-3,20-dione 17-acetate, 6α,7α-oxido-16β-methyl-Δ$^4$-pregnen-17α-ol-3,20-dione 17-acetate and 6α,7α-oxido-16β-methyl-19-nor-Δ$^4$-pregnen-17α - ol - 3,20 - dione 17-acetate, was the steroid starting materials, 6-fluoro-16α-methyl-Δ$^{4,6}$-pregnadien-17α-ol-3,20-dione 17 - acetate, 6-fluoro-16β-methyl-Δ$^{4,6}$-pregnadien-17α-ol-3,20 - dione 17-acetate and 6-fluoro-16β-methyl-19-nor-Δ$^{4,6}$ - pregnadien-17α-ol-3,20-dione 17-acetate, respectively, were obtained.

PREPARATION E

A suspension of 5 g. of 16α-methyl-6α-chloro-Δ$^4$-pregnen-17α-ol-3,20-dione acetate in 37.5 cc. of anhydrous peroxide-free dioxane was treated with 6 cc. of freshly distilled ethyl orthoformate and 4 g. of p-toluenesulfonic acid. The mixture was stirred at room temperature for 15 minutes and the resulting solution let stand for 30 minutes further. 4 cc. of pyridine were added and then water. The formed precipitate was collected by filtration, water washed and air dried. There were thus obtained 3-ethoxy-16α-methyl-6-chloro-Δ$^{3,5}$-pregnadien - 17α - ol-3,20-dione acetate which was used for the next step without further purification.

A solution of 5 g. of the foregoing enol ether in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene chloride was added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 16α-methyl-6-chloro-Δ$^{4,6}$-pregnadien-17α-ol-3,20-dione acetate which was identical with the compound described in Preparation C.

PREPARATION F

In accordance with the method described in the preceding preparation, the compounds listed below under I were converted into the corresponding 6-dehydro derivatives II:

| I | II |
|---|---|
| 16α-methyl-6β-fluoro-Δ$^4$-pregnen-17α-ol-3,20-dione acetate. | 16α-methyl-6-fluoro-Δ$^{4,6}$-pregnadien-17α-ol-3,20-dione acetate. |
| 6,16α-dimethyl-Δ$^4$-pregnen-17α-ol-3,20-dione propionate. | 6,16α-dimethyl-Δ$^{4,6}$-pregnadien-17α-ol-3,20-dione propionate. |
| 6α,16β-dimethyl-Δ$^4$-pregnen-17α-ol-3,20-dione. | 6,16β-dimethyl-Δ$^{4,6}$-pregnadien-17α-ol-3,20-dione. |
| 16α-methyl-Δ$^4$-pregnen-17α-ol-3,20-dione. | 16α-methyl-Δ$^{4,6}$-pregnadien-17α-ol-3,20-dione. |

Example I

To a solution of 1 g. of the acetate of 6-chloro-6-dehydro-17α-hydroxy progesterone in 50 cc. of 95% ethanol there was added 100 mg. of sodium borohydride, and the reaction mixture was kept at room temperature for 40 minutes. There were then cautiously added 5 cc. of acetone and 0.2 cc. of concentrated hydrochloric acid, and the mixture diluted with water. The product was then extracted with ether and the organic extract washed with 5% sodium carbonate solution and water to neutral, dried over anhydrous sodium sulfate and evaporated to dryness. The residue was crystallized from acetone-hexane to produce 840 mg. of 6-chloro-Δ$^{4,6}$-pregnadiene-3β, 17α-diol-20-one 17-acetate, M.P. 193–195° C.; [α]$_D$ —63° (CHCl$_3$).

This procedure was then repeated in every detail but one, namely, 6-chloro-Δ$^{4,6}$-pregnadien-17α-ol-3,20-dione 17-acetate was replaced by Δ$^{4,6}$-pregnadien-17α-ol-3,20-dione 17-acetate,
6-fluoro-Δ$^{4,6}$-pregnadien-17α-ol-3,20-dione 17-acetate,
6-chloro-Δ$^{4,6}$-pregnadien-17α-ol-3,20-dione 17-propionate,
6-chloro-Δ$^{4,6}$-pregnadien-17α-ol-3,20-dione 17-butyrate,
6-chloro-Δ$^{4,6}$-pregnadien-17α-ol-3,20-dione 17-cyclopentylpropionate,
6-chloro-Δ$^{4,6}$-pregnadien-17α-ol-3,20-dione 17-caproate,
6-bromo-Δ$^{4,6}$-pregnadien-17α-ol-3,20-dione 17-acetate,
16α-methyl-Δ$^{4,6}$-pregnadien-17α-ol-3,20-dione 17-acetate,
16β-methyl-Δ$^{4,6}$-pregnadien-17α-ol-3,20-dione 17-acetate,
6-fluoro-16α-methyl-Δ$^{4,6}$-pregnadien-17α-ol-3,20-dione 17-acetate, 6-chloro-16α-methyl-Δ$^{4,6}$-pregnadien-17α-ol-3,20-dione 17-acetate,
6-chloro-16α-methyl-Δ$^{4,6}$-pregnadien-17α-ol-3,20-dione 17-valerate,
6-bromo-16α-methyl-Δ$^{4,6}$-pregnadien-17α-ol-3,20-dione 17-acetate,
6-fluoro-16β-methyl-Δ$^{4,6}$-pregnadien-17α-ol-3,20-dione 17-acetate,
6-chloro-16β-methyl-Δ$^{4,6}$-pregnadien-17α-ol-3,20-dione 17-acetate,
6-bromo-16β-methyl-Δ$^{4,6}$-pregnadien-17α-ol-3,20-dione 17-acetate,
19-nor-Δ$^{4,6}$-pregnadien-17α-ol-3,20-dione 17-acetate,
6-fluoro-19-nor-Δ$^{4,6}$-pregnadien-17α-ol-3,20-dione 17-acetate,
6-chloro-19-nor-Δ$^{4,6}$-pregnadien-17α-ol-3,20-dione 17-acetate,
6-chloro-19-nor-Δ$^{4,6}$-pregnadien-17α-ol-3,20-dione 17-caproate,
6-bromo-19-nor-Δ$^{4,6}$-pregnadien-17α-ol-3,20-dione 17-acetate,
16α-methyl-19-nor-Δ$^{4,6}$-pregnadien-17α-ol-3,20-dione 17-acetate,
16β-methyl-19-nor-Δ$^{4,6}$-pregnadien-17α-ol-3,20-dione 17-acetate,
6-fluoro-16α-methyl-19-nor-Δ$^{4,6}$-pregnadien-17α-ol-3,20-dione 17-acetate,
6-chloro-16α-methyl-19-nor-Δ$^{4,6}$-pregnadien-17α-ol-3,20-dione 17-acetate,
6-bromo-16α-methyl-19-nor-Δ$^{4,6}$-pregnadien-17α-ol-3,20-dione 17-acetate,
6-fluoro-16β-methyl-19-nor-Δ$^{4,6}$-pregnadien-17α-ol-3,20-dione 17-acetate,
6-chloro-16β-methyl-19-nor-Δ$^{4,6}$-pregnadien-17α-ol-3,20-dione 17-acetate, and
6-bromo-16β-methyl-19-nor-Δ$^{4,6}$-pregnadien-17α-ol-3,20-dione 17-acetate, respectively.

In each case, the corresponding 3β-ol, namely,

Δ$^{4,6}$-pregnadiene-3β, 17α-diol-20-one 17-acetate,
6-fluoro-Δ$^{4,6}$-pregnadiene-3β, 17α-diol-20-one 17-acetate,
6-chloro-Δ$^{4,6}$-pregnadiene-3β, 17α-diol-20-one 17-propionate,
6-chloro-Δ$^{4,6}$-pregnadiene-3β, 17α-diol-20-one 17-butyrate,
6-chloro-Δ$^{4,6}$-pregnadiene-3β, 17α-diol-20-one 17-cyclopentylpropionate,
6-chloro-Δ$^{4,6}$-pregnadiene-3β, 17α-diol-20-one 17-caproate,
6-bromo-Δ$^{4,6}$-pregnadiene-3β, 17α-diol-20-one 17-acetate,
16α-methyl-Δ$^{4,6}$-pregnadiene-3β,17α-diol-20-one 17-acetate,
16b-methyl-Δ$^{4,6}$-pregnadiene-3β, 17α-diol-20-one 17-acetate,
6-fluoro-16α-methyl-Δ$^{4,6}$-pregnadiene-3β, 17α-diol-20-one 17-acetate,
6-chloro-16α-methyl-Δ$^{4,6}$-pregnadiene-3β, 17α-diol-20-one 17-acetate,
6-chloro-16α-methyl-Δ$^{4,6}$-pregnadiene-3β, 17α-diol-20-one 17-valerate,
6-bromo-16α-methyl-Δ$^{4,6}$-pregnadiene-3β, 17α-diol-20-one 17-acetate,
6-fluoro-16β-methyl-Δ$^{4,6}$-pregnadiene-3β, 17α-diol-20-one 17-acetate,
6-chloro-16β-methyl-Δ$^{4,6}$-pregnadiene-3β, 17α-diol-20-one 17-acetate,
6-bromo-16β-methyl-Δ$^{4,6}$-pregnadiene-3β, 17α-diol-20-one 17-acetate,
19-nor-Δ$^{4,6}$-pregnadiene-3β, 17α-diol-20-one 17-acetate,
6-fluoro-19-nor-Δ$^{4,6}$-pregnadiene-3β, 17α-diol-20-one 17-acetate,
6-chloro-19-nor-Δ$^{4,6}$-pregnadiene-3β,17α-diol-20-one 17-acetate,
6-chloro-19-nor-Δ$^{4,6}$-pregnadiene-3β, 17α-diol-20-one 17-caproate,
6-bromo-19-nor-Δ$^{4,6}$-pregnadiene-3β, 17α-diol-20-one 17-acetate,
16α-methyl-19-nor-Δ$^{4,6}$-pregnadiene-3β, 17α-diol-20-one 17-acetate,
16β-methyl-19-nor-Δ$^{4,6}$-pregnadiene-3β, 17α-diol-20-one 17-acetate,
6-fluoro-16α-methyl-19-nor-Δ$^{4,6}$-pregnadiene-3β, 17α-diol-20-one 17-acetate,
6-chloro-16α-methyl-19-nor-Δ$^{4,6}$-pregnadiene-3β, 17α-diol-20-one 17-acetate,
6-bromo-16α-methyl-19-nor-Δ$^{4,6}$-pregnadiene-3β, 17α-diol-20-one 17-acetate,
6-fluoro-16β-methyl-19-nor-Δ$^{4,6}$-pregnadiene-3β, 17α-diol-20-one 17-acetate,
6-chloro-16β-methyl-19-nor-Δ$^{4,6}$-pregnadiene-3β, 17α-diol-20-one 17-acetate and 6-bromo-16β-methyl-19-nor-Δ$^{4,6}$-pregnadiene-3β, 17α-diol-20-one 17-acetate, respectively, was obtained.

Example II

A mixture of 750 mg. of 6-chloro-Δ$^{4,6}$-pregnadiene-3β, 17α-diol-20-one 17-acetate, 3 cc. of pyridine and 3 cc. of acetic anhydride was kept at room temperature for 4 hours. It was then diluted with water and the formed precipitate collected by filtration, washed with water and air dried. Crystallization from acetone-ether gave the pure diacetate of 6-chloro-Δ$^{4,6}$-pregnadiene-3β,17α-diol-20-one, M.P. 198–201° C.;[α]$_D$ −87° (CHCl$_3$).

By repeating this procedure using the remaining 3β-ols produced in Example I, the corresponding 3β-acetates thereof are formed.

Example III

By repeating the method of Example II except that the acetic anhydride was substituted by propionic anhydride, butyric anhydride, caproic anhydride and enanthic anhydride, there were correspondingly obtained the 3β-propionates, 3β-butyrates, 3β-caproates and the 3β-enanthates.

Example IV

To a solution of 500 mg. of the 17-acetate of 6-chloro-Δ$^{4,6}$-pregnadiene-3β,17α-diol-20-one in 25 cc. of ethanol there was added 250 mg. of sodium hydroxide, and the reaction mixture was refluxed for 1 hour. It was then diluted with water and the product extracted with ethyl acetate, the organic extract was washed with water to neutral, dried over anhydrous sodium sulfate and evaporated to dryness, thus producing 6-chloro-Δ$^{4,6}$-pregnadiene-3β,17α-diol-20-one.

By repeating this procedure in every detail but one, namely, using the remaining 3β-ol-17α-acylates produced in Example I as the starting material, the corresponding 3β,17β-diols were obtained.

Example V 6-chloro-Δ$^{4,6}$-pregnadiene-3β,17α-diol-20-one was reacted with acetic anhydride in pyridine in the manner described in Example II hereinabove, thus giving 6-chloro-Δ$^{4,6}$-pregnadiene-3β,17α-diol-20-one 3-acetate, M.P. 175–177° C.

By repeating this procedure using the remaining free 3β,17α-diols prepared as described in Example IV hereinabove as the steroid starting materials, the corresponding 3-acetates were obtained.

Similarly, by replacing acetic anhydride with propionic, butyric, caproic and enanthic anhydrides, and using each of the free 3β,17α-diols prepared as described in Example IV hereinabove as the steroid starting materials, the corresponding 3-propionates, 3-butyrates, 3-caproates and 3-enanthates were obtained.

Example VI

A culture of *Streptomyces roseochromogenus*, ATCC No. 3347, was prepared in an inclined agar medium containing 1% by weight of glucose and 1% by weight of yeast extract, each based on the total weight of the medium. One cc. portions of a suspension of this culture were then used to innoculate each of a series of 250 cc. Erlenmeyer flasks which each contained 50 cc. of a sterilized aqueous medium containing 2% by weight of peptone and 5% by weight of corn syrup, each based on the total weight of the sterilized aqueous medium. The resulting mixtures were then incubated, with shaking and under aeration, at 28° C., for 48 hours, thus giving vegetating growing cultures of the microorganism.

Ten mg. of 6-chloro-$\Delta^{4,6}$-pregnadiene-3$\beta$,17$\beta$-diol-20-one were added to each flask, and the resulting mixtures were incubated, with stirring and under aeration, at 28° C. for 72 hours, following which the mixtures were combined and extracted several times with methylene dichloride. The thus-obtained extract was washed with water,, dried over anhydrous sodium sulfate, filtered, and the filtrate evaporated to dryness under reduced pressure. Chromatography of the resulting residue on silica gel gave 6-chloro-$\Delta^{4,6}$-pregnadiene-3$\beta$,16$\alpha$,17$\alpha$-triol-20-one.

By repeating this procedure in every detail but one, namely, using the remaining 16-unsubstituted-3$\beta$,17$\alpha$-diols prepared as described in Example IV hereinabove as the steroid starting materials, the corresponding 3$\beta$, 16$\alpha$,17$\alpha$-triols namely, $\Delta^{4,6}$-pregnadiene-3$\beta$,16$\alpha$,17$\alpha$-triol-20-one, 6-fluoro-$\Delta^{4,6}$-pregnadiene-3$\beta$,16$\alpha$,17$\alpha$-triol-20-one, 6 - bromo-$\Delta^{4,6}$-pregnadiene-3$\beta$,16$\alpha$,17$\alpha$-triol-20-one, 19-nor-$\Delta^{4,6}$-pregnadiene-3$\beta$,16$\alpha$,17$\alpha$-triol-20-one, 6-fluoro-19-nor-$\Delta^{4,6}$-pregnadiene-3$\beta$,16$\alpha$,17$\alpha$-triol-20-one, 6-chloro-19-nor-$\Delta^{4,6}$-pregnadiene-3$\beta$,16$\alpha$,17$\alpha$-triol-20-one, and 6-bromo - 19-nor-$\Delta^{4,6}$-pregnadiene-3$\beta$,16$\alpha$,17$\alpha$-triol-20-one, respectively, were obtained.

Example VII

A mixture of 1 gram of 6-chloro-$\Delta^{4,6}$-pregnadiene-3$\beta$, 16$\alpha$,17$\alpha$-triol-20-one, 50 cc. of acetone and 0.5 cc. of an aqueous 72% solution of perchloric acid was allowed to stand at room temperature, with stirring, for 1 hour. Following this reaction period the reaction mixture was washed with an aqueous sodium bicarbonate solution and then with water until neutral, then steam distilled and the product extracted with methylene dichloride. The resulting extract was then dried over anhydrous sodium sulfate and evaporated to dryness. Crystallization of the thus-obtained residue from acetone-hexane gave 6-chloro- 16$\alpha$, 17$\alpha$-isopropylidenedioxy-$\Delta^{4,6}$-pregnadien-3$\beta$-ol-20-one.

This procedure was then repeated in every detail but one, namely, the remaining 3$\beta$, 16$\alpha$, 17$\alpha$-triols prepared as described in Example VI hereinabove were used as the steroid starting materials. In each case, the corresponding 16$\alpha$, 17$\alpha$-acetonide, namely, 16$\alpha$, 17$\alpha$-isopropylidenedioxy-$\Delta^{4,6}$-pregnadien-3$\beta$-ol-20-one, 6-fluoro-16$\alpha$, 17$\alpha$-isopropylidenedioxy - $\Delta^{4,6}$ - pregnadien-3$\beta$-ol-20-one, 6-bromo-16$\alpha$, 17$\alpha$-isopropylidenedioxy - $\Delta^{4,6}$ - pregnadien-3$\beta$-ol-20-one, 16$\alpha$, 17$\alpha$ - isopropylidenedioxy-19-nor-$\Delta^{4,6}$-pregnadien-3$\beta$-ol-20-one, 6-fluoro - 16$\alpha$, 17$\alpha$-isopropylidenedioxy-19-nor-$\Delta^{4,6}$-pregnadien-3$\beta$-ol-20-one, 6 - chloro - 16$\alpha$, 17$\alpha$-isopropylidenedioxy-19-nor - $\Delta^{4,6}$ - pregnadien-3$\beta$-ol-20-one, and 6-bromo-16$\alpha$, 17$\alpha$-isopropylidenedioxy - 19-nor-$\Delta^{4,6}$-pregnadien-3$\beta$-ol-20-one, respectively, was obtained.

Similarly by replacing acetone with methyl ethyl ketone, cyclohexanone and acetophenone, and using each of the 3$\beta$, 16$\alpha$, 17$\alpha$-triols just mentioned, the corresponding 16$\alpha$, 17$\alpha$-(2'-butylidenedioxy), 16$\alpha$, 17$\alpha$-cyclohexylidenedioxy and 16$\alpha$, 17$\alpha$-(2'-phenylethylidenedioxy) derivatives were obtained.

Example VIII 6-chloro-16$\alpha$, 17$\alpha$-isopropylidenedioxy-$\Delta^{4,6}$-pregnadien-3$\beta$-ol-20-one was reacted with acetic anhydride in pyridine in the manner described in Example II hereinabove, thus giving 6-chloro-16$\alpha$, 17$\alpha$-isopropylidenedioxy-$\Delta^{4,6}$-pregnadien-3$\beta$-ol-20-one 3-acetate.

By repeating this procedure using the remaining 16$\alpha$, 17$\alpha$-isopropylidenedioxy steroids prepared as described in Example VII hereinabove, the corresponding 3-acetates were obtained.

Example IX

One gram of 6-chloro-16$\alpha$, 17$\alpha$-isopropylidenedioxy-$\Delta^{4,6}$-pregnadien-3$\beta$-ol-20-one 3-acetate was admixed with 20 cc. of 60% formic acid, and the resulting reaction mixture was heated on a steam bath for 1 hour. Following this reaction period the reaction mixture was cooled to room temperature and diluted with water. The resulting precipitate was collected by filtration, washed with water and dried. Recrystallization from acetone-hexane gave 6-chloro-$\Delta^{4,6}$-pregnadiene-3$\beta$, 16$\alpha$, 17$\alpha$ - triol - 20 - one 3-acetate.

By repeating this procedure using the remaining 16$\alpha$, 17$\alpha$-isopropylidendioxy 3-acetates prepared as described in Example VIII hereinabove as the steroid starting materials, the corresponding free 16$\alpha$, 17$\alpha$-diols, namely, $\Delta^{4,6}$-pregnadiene-3$\beta$, 16$\alpha$, 17$\alpha$-triol-20-one 3-acetate, 6-fluoro-$\Delta^{4,6}$-pregnadiene-3$\beta$, 16$\alpha$, 17$\alpha$-triol-20-one 3-acetate, 6-bromo-$\Delta^{4,6}$-pregnadiene-3$\beta$, 16$\alpha$, 17$\alpha$-triol-20-one 3-acetate, 19-nor-$\Delta^{4,6}$-pregnadiene-3$\beta$, 16$\alpha$, 17$\alpha$-triol-20-one 3-acetate, 6-fluoro-19-nor-$\Delta^{4,6}$-pregnadiene-3$\beta$, 16$\alpha$, 17$\alpha$-triol-20-one 3-acetate, 6-chloro-19-nor-$\Delta^{4,6}$-pregnadiene-3$\beta$, 16$\alpha$, 17$\alpha$-triol-20-one 3-acetate, and 6-bromo-19-nor-$\Delta^{4,6}$-pregnadiene-3$\beta$, 16$\alpha$, 17$\alpha$-triol-20-one 3-acetate, respectively, were obtained.

Example X

A mixture of 1 gram of 6-chloro-$\Delta^{4,6}$-pregnadiene-3$\beta$, 16$\alpha$, 17$\alpha$-triol-20-one 3-acetate, 1 gram of p-toluenesulfonic acid monohydrate, 0 cc. of acetic acid and 25 cc. of acetic anhydride was allowed to stand for 24 hours at room temperature. Following this reaction period the reaction mixture was poured into water and stirred until the excess acetic anhydride present had hydrolyzed, and this solution was then extracted with methylene dichloride. The thus-obtained extract was then washed with water, dried over anhydrous sodium sulfate and evaporated to dryness. Crystallization of the resulting residue from acetone-diethyl ether gave 6-chloro-$\Delta^{4,6}$-pregnadiene-3$\beta$, 16$\alpha$, 17$\alpha$-triol-20-one 3,16,17-triacetate.

By repeating this procedure using the remaining 3$\beta$, 16$\alpha$, 17$\alpha$-triol 3-acetates prepared as described in Example IX hereinabove as the steroid starting materials, the corresponding 3,16,17-triacetates were obtained.

Similarly, by repeating this procedure using the free 3$\beta$, 16$\alpha$, 17$\alpha$-triols prepared as described in Example VI hereinabove as the steroid starting materials, and replacing the mixture of acetic anhydride and acetic acid with mixtures of propionic anhydride and propionic acid, butyric anhydride and butyric acid, and caproic anhydride and caproic acid, the corresponding 3,16,17 - tripropionates, 3,16,17-tributyrates and 3,16,17-tricaproates were obtained.

Example XI

A solution of 1 gram of 6-chloro-$\Delta^{4,6}$-pregnadiene-3$\beta$, 16$\alpha$, 17$\alpha$-triol-20-one 3,16,17-triacetate in 25 cc. of methanol was admixed with a solution of 0.6 grams of potassium hydroxide in 5 cc. of water, and the resulting reaction mixture was allowed to stand at room temperature for 3 hours. Following this reaction period the reaction mixture was poured into ice water and the resulting precipitate was collected by filtration, washed with water until neutral and dried. Recrystallization from methylene dichloride-diethyl ether gave 6-chloro-$\Delta^{4,6}$-pregnadiene-3$\beta$, 16$\alpha$, 17$\alpha$-triol 20-one 17-acetate.

By repeating this procedure using the remaining 3,16, 17-triacetates prepared as described in Example X hereinabove as the steroid starting materials, the corresponding 17-monoacetates, namely, $\Delta^{4,6}$-pregnadiene-3$\beta$, 16$\alpha$, 17$\alpha$-triol-20-one 17-acetate 6-fluoro-$\Delta^{4,6}$- pregnadiene-3$\beta$, 16$\alpha$, 17$\alpha$-triol-20-one 17-acetate, 6-bromo-$\Delta^{4,6}$-pregnadiene-3$\beta$, 16$\alpha$, 17$\alpha$-triol-20-one 17-acetate, 19-nor-$\Delta^{4,6}$-pregnadiene-3$\beta$, 16$\alpha$, 17$\alpha$-triol-20-one, 17-acetate, 6-fluoro-19-nor-$\Delta^{4,6}$- pregnadiene-3β, 16α, 17α-triol-20-one 17-acetate, 6-chloro-19-nor-Δ⁴,⁶-pregnadiene-3β, 16α, 17α-triol-20-one 17-acetate, and 6-bromo-Δ⁴,⁶-pregnadiene-3β, 16α, 17α-triol-20-one 17-acetate, respectively, were obtained.

Example XII

A solution of 1 gram of 6 - chloro - Δ⁴,⁶ - pregnadiene-3β,16α,17α - triol - 20 - one 17 - acetate in 50 ml. of pyridine was admixed with 1 molar equivalent of acetic anhydride, and the resulting reaction mixture was held at 20° C. for 6 hours. Following this reaction period the reaction mixture was poured into ice water and the resulting precipitate was collected by filtration, washed with water and dried. Chromatography of the dry precipitate on 200 times its weight of silica gel, using ethyl acetate-hexane (20:80, respectively, by volume) as the eluant, gave 6 - chloro - Δ⁴,⁶ - pregnadiene - 3β,16α,17α - triol-20 - one 3,17 - diacetate.

By repeating this procedure using the remaining 17-monoacetate prepared as described in Example XI hereinabove as the steroid starting materials, the corresponding 3,17 - diacetates were obtained.

Similarly, by replacing acetic anhydride with propionic, butyric and caproic anhydrides, and using each of the 17-monoacetates prepared as described in Example XI hereinabove as the steroid starting materials, the corresponding 3 - propionate 17 - acetates, 3 - butyrate 17 - acetates and 3 - caproate 17 - acetates were obtained.

Example XIII

A solution of 1 g. of the 17 - acetate of 6 - chloro-Δ⁴,⁶ - pregnadiene - 3β,17α - diol - 20 - one in 4 cc. of pyridine and 4 cc. of caproic anhydride was kept at room temperature overnight, poured into ice water, the formed precipitate was filtered, washed with water and dried. Crystallization from acetone-hexane gave the 17 - acetate-3 - caproate of 6 - chloro - Δ⁴,⁶ - pregnadiene - 3β,17α-diol - 20 - one.

Example XIV

By following the method of Example I, the compounds listed below under I were converted into the products set forth under II:

| I | II |
|---|---|
| 6-methyl-Δ⁴,⁶-pregnadien-17α-ol-3,20-dione caproate. | 6-methyl-Δ⁴,⁶-pregnadiene-3β,17α-diol-20-one 17-caproate. |
| 16α,17α-isopropylidenedioxy-Δ⁴,⁶-pregnadiene-3,20-dione. | 16α,17α-isopropylidenedioxy-Δ⁴,⁶-pregnadien-3β-ol-20-one. |
| 6,16α-dimethyl-Δ⁴,⁶-pregnadien-17α-ol-3,20-dione. | 6,16α-dimethyl-Δ⁴,⁶-pregnadiene-3β,17α-diol-20-one. |
| 6-chloro-16α,17α-isopropylidenedioxy-Δ⁴,⁶-pregnadiene-3,20-dione. | 6-chloro-16α,17α-isopropyldienedioxy-Δ⁴,⁶-pregnadien-3β-ol-20-one. |
| 6-fluoro-16α,17α-isopropylidenedioxy-Δ⁴,⁶-pregnadiene-3,20-dione. | 6-fluoro-16α,17α-isopropylidenedioxy-Δ⁴,⁶-pregnadien-3β-ol-20-one. |
| 6,16α-dimethyl-Δ⁴,⁶-pregnadien-17α-ol-3,20-dione propionate. | 6,16α-dimethyl-Δ⁴,⁶-pregnadiene-3β,17α-diol-20-one 17-propionate. |
| 6,16β-dimethyl-Δ⁴,⁶-pregnadien-17α-ol-3,20-dione. | 6,16β-dimethyl-Δ⁴,⁶-pregnadiene-3β,17α-diol-20-one. |
| Δ⁴,⁶-pregnadiene-16α,17α-diol-3,20-dione diacetate. | Δ⁴,⁶-pregnadiene-3β,16α,17α-triol-20-one 17-acetate. |
| 6-chloro-Δ⁴,⁶-pregnadiene-16α,17α-diol-3,20-dione diacetate. | 6-chloro-Δ⁴,⁶-pregnadiene-3β,16α,17α-triol-20-one 17-acetate. |

Example XV

By following the esterification method of Example II, 6 - methyl - Δ⁴,⁶ - pregnadiene - 3β,17α - diol - 20 - one 17 - caproate and 16α,17α - isopropylidenedioxy - Δ⁴,⁶-pregnadien - 3β - ol - 20 - one were converted respectively into: 6 - methyl - Δ⁴,⁶ - pregnadiene - 3β,17α - diol - 20-one 3 - acetate 17 - caproate and 16α,17α - isopropylidenedioxy - Δ⁴,⁶ - pregnadien - 3β - ol - 20 - one acetate.

Example XVI

In accordance with the method described in Example XIII, the compounds mentioned below under I were esterified with the indicated carboxylic acid anhydrides, to produce the corresponding diesters listed under II:

| I | Anhydride | II |
|---|---|---|
| 16α-methyl-6-fluoro-Δ⁴,⁶-pregnadiene-3β,17α-diol-20-one 17-acetate. | Propionic | 16α-methyl-6-fluoro-Δ⁴,⁶-pregnadiene-3β,17α-diol-20-one 3-propionate 17-acetate. |
| 16α-methyl-6-chloro-Δ⁴,⁶-pregnadiene-3β,17α-diol-20-one 17-acetate. | Caproic | 16α-methyl-6-chloro-Δ⁴,⁶-pregnadiene-3β,17α-diol-20-one 3-caproate 17-acetate. |
| 6,16α-dimethyl-Δ⁴,⁶-pregnadiene-3β,17α-diol-20-one 17-acetate. | Propionic | 6,16α-dimethyl-Δ⁴,⁶-pregnadiene-3β,17α-diol-20-one dipropionate. |
| Δ⁴,⁶-pregnadiene-3β,17α-diol-20-one 17-acetate. | Cyclopentylpropionic | Δ⁴,⁶-pregnadiene-3β,17α-diol-20-one 3-cyclopentylpropionate 17-acetate. |
| 6-methyl-Δ⁴,⁶-pregnadiene-3β,17α-diol-20-one 17-caproate. | Caproic | 6-methyl-Δ⁴,⁶-pregnadiene-3β,17α-diol-20-one 3,17-dicaproate. |

Example XVII

In accordance with the method of Example XIII, 16α,17α - isopropylidenedioxy - Δ⁴,⁶ - pregnadien - 3β - ol-20 - one, 6 - chloro - 16α,17α - isopropylidenedioxy-Δ⁴,⁶ - pregnadien - 3β - ol - 20 one and 6 - fluoro - 16α,17α-isopropylidenedioxy - Δ⁴,⁶ - pregnadien - 3β - ol - 20 - one were esterified with propionic, caproic and cyclopentylpropionic anhydrides, to produce the corresponding propionates, caproates and cyclopentylpropionates.

Example XVIII

In accordance with the method of Example II, 6,16α-dimethyl - Δ⁴,⁶ - pregnadiene - 3β,17α - diol - 20 - one, 6,16β - dimethyl - Δ⁴,⁶ - pregnadiene - 3β,17α - diol - 20-one, 16α - methyl - Δ⁴,⁶ - pregnadiene - 3β,17α - diol - 20-one, Δ⁴,⁶ - pregnadiene - 3β,16α,17α - triol - 20 - one 17-acetate and 6 - chloro - Δ⁴,⁶ - pregnadiene - 3β,16α,17α-triol - 20 - one 17 - acetate were converted respectively into: 6,16α - dimethyl - Δ⁴,⁶ - pregnadiene - 3β,17α - diol-20 - one 3 - acetate, 6,16β - dimethyl - Δ⁴,⁶ - pregnadiene-3β,17α - diol - 20 - one 3 - acetate, 16α - methyl - Δ⁴,⁶-pregnadiene - 3β,17α - diol - 20 - one 3 - acetate, Δ⁴,⁶-pregnadiene - 3β,16α,17α - triol - 20 - one triacetate and 6 - chloro - Δ⁴,⁶ - pregnadiene - 3β,16α,17α - triol - 20-one triacetate.

Example XIX

By the following saponification method of Example IV, Δ⁴,⁶-pregnadiene-3β,17α-diol-20-one 17-acetate, 6-fluoro-Δ⁴,⁶-pregnadiene-3β,17α-diol-20-one 17-acetate, 6-methyl-Δ⁴,⁶-pregnadiene-3β,17α-diol-20-one 17-caproate and 6,16α-dimethyl-Δ⁴,⁶-pregnadiene-3β,17α-diol-20-one 17-propionate were converted into the corresponding free compounds.

Example XX

To a solution of 1 g. of 6-chloro-Δ⁴,⁶-pregnadiene-3β,17α-diol-20-one in 20 cc. of anhydrous benzene there were added 0.2 g. of p-toluenesulfonic acid and 2 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the diacetate of 6-chloro-Δ⁴,⁶-pregnadiene-3β,17α-diol-20-one, identical to that obtained in Example II.

In a similar manner but using propionic, caproic and cyclopentylpropionic anhydrides as esterifying agents there were produced the dipropionate, dicaproate and dicyclopentylpropionate of 6 - chloro - Δ⁴,⁶-pregnadiene-3β,17α-diol-20-one.

It will be obvious to those skilled in the art that other changes and variations can be made in carrying out the present invention without depatring from the spirit and scope thereof as defined in the appended claims.

We claim:
1. A compound represented by the general formula:

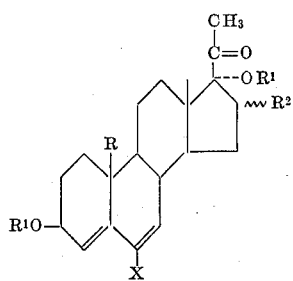

wherein R is selected from the group consisting of hydrogen and methyl, $R^1$ is selected from the group consisting of hydrogen and a hydrocarbon carboxylic acyl group containing less than 12 carbon atoms, $R^2$ is selected from the group consisting of α-hydrocarbon carboxylic acyloxy and α-hydroxy, $OR^1$ and $R^2$ taken together represent the grouping

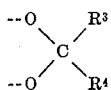

wherein $R^3$ and $R^4$ are selected from the group consisting of hydrogen, an alkyl group and an aryl group containing up to 8 carbon atoms, inclusive, and X is selected from the group consisting of hydrogen, methyl, fluoro, chloro and bromo.

2. Compounds according to claim 1 wherein $OR^1$ and $R^2$ taken together is the group

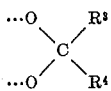

wherein $R^3$ is methyl and $R^4$ is methyl, ethyl, phenyl, or when taken together with $R^3$ and the carbon atom to which they are attached, cyclohexyl.

3. Compounds according to claim 2 wherein $OR^1$ and $R^2$ taken together is the group

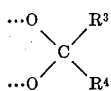

wherein $R^3$ is methyl and $R^4$ is methyl.

4. Compounds according to claim 2 wherein $OR^1$ and $R^2$ taken together is the group

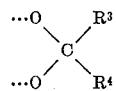

wherein $R^3$ is methyl and $R^4$ is ethyl.

5. Compounds according to claim 2 wherein $OR^1$ and $R^2$ taken together is the group

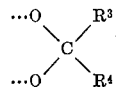

wherein $R^3$ is methyl and $R^4$ is phenyl.

6. Compounds according to claim 2 wherein $OR^1$ and $R^2$ taken together is the group

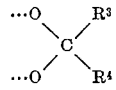

wherein $R^3$ and $R^4$, taken together with the carbon atom to which they are attached, is cyclohexyl.

7. Compounds according to claim 1 wherein $R^1$ is hydrocarbon carboxylic acyl of less than 12 carbon atoms and $R^2$ is α-hydrocarbon carboxylic acyloxy of less than 12 carbon atoms.

8. Compounds according to claim 7 wherein $R^1$ is acetyl and $R^2$ is acetoxy.

9. $\Delta^{4,6}$-pregnadiene-3β,16α,17α-triol-20-one.

10. 6 - halo - $\Delta^{4,6}$-pregnadiene-3β,16α,17α-triol-20-one wherein the halogen has an atomic number less than 53.

11. 6-chloro-$\Delta^{4,6}$-pregnadiene-3β,16α,17α-triol-20-one.

12. 6 - chloro-$\Delta^{6,4}$-pregnadiene-3β,16α,17α-triol-20-one 3-acetate.

13. 6 - chloro - 16α,17α-isopropylidenedioxy-$\Delta^{4,6}$-pregnadien-3β-ol-20-one.

14. 6 - chloro - 16α,17α-isopropylidenedioxy-$\Delta^{4,6}$-pregnadien-3β-ol-20-one 3-acetate.

References Cited
UNITED STATES PATENTS

| | | | |
|---|---|---|---|
| 3,314,944 | 4/1967 | Diassi et al. | 260—397.4 |
| 3,326,902 | 6/1967 | Diassi | 260—397.4 |
| 3,126,399 | 3/1964 | Soliman | 260—397.4 |
| 3,139,424 | 6/1964 | Zderic et al. | 260—397.4 |
| 3,198,792 | 8/1965 | Reerink et al. | 260—239.5 |

LEWIS GOTTS, *Primary Examiner.*

J. R. BROWN, *Assistant Examiner.*